United States Patent [19]
Walloch

[11] Patent Number: 5,152,630
[45] Date of Patent: Oct. 6, 1992

[54] SWAGE WITH AFTER-SWAGE DIMENSION INDICATOR

[75] Inventor: Harry L. Walloch, North Little Rock, Ark.

[73] Assignee: The Crosby Group, Inc., Tulsa, Okla.

[21] Appl. No.: 649,071

[22] Filed: Feb. 1, 1991

[51] Int. Cl.⁵ .................. F16B 11/00; B23P 11/00
[52] U.S. Cl. ........................................ 403/284; 29/517
[58] Field of Search ............ 403/284, 285, 274, 212, 403/279; 29/517, 511, 510; 24/129 W, 115 A

[56] References Cited

U.S. PATENT DOCUMENTS

| | | | |
|---|---|---|---|
| 1,793,293 | 2/1931 | Varney et al. | 403/284 |
| 1,959,402 | 5/1934 | Anderson | 403/284 |
| 2,008,227 | 7/1935 | Reilly | 403/284 |
| 2,052,958 | 9/1936 | Webb | 403/284 X |
| 2,411,079 | 11/1946 | Baule | 29/517 X |
| 2,910,983 | 11/1959 | Everett | 403/284 X |
| 3,192,622 | 7/1965 | Bannerman | 29/517 |
| 3,471,904 | 10/1969 | Aho | 403/284 X |
| 4,419,804 | 12/1983 | Axthammer | 29/517 X |

FOREIGN PATENT DOCUMENTS 971804 10/1964 United Kingdom .................. 29/517

Primary Examiner—Peter M. Cuomo
Attorney, Agent, or Firm—Head & Johnson

[57] ABSTRACT

A swage includes a before swage dimension portion and a portion that is of dimension or diameter equal to a specified after-swage dimension.

7 Claims, 2 Drawing Sheets

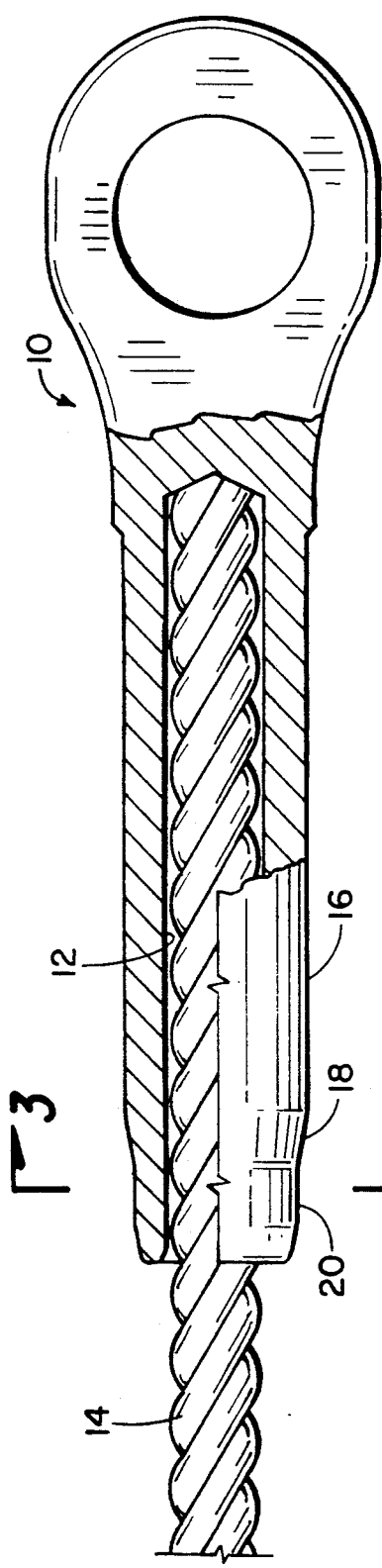
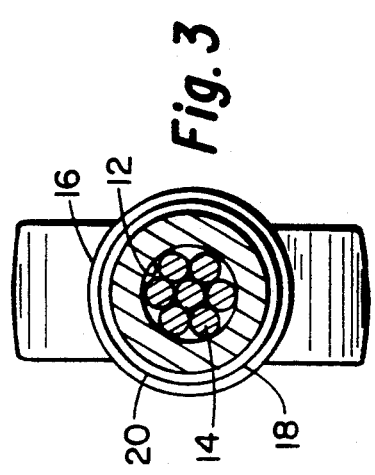
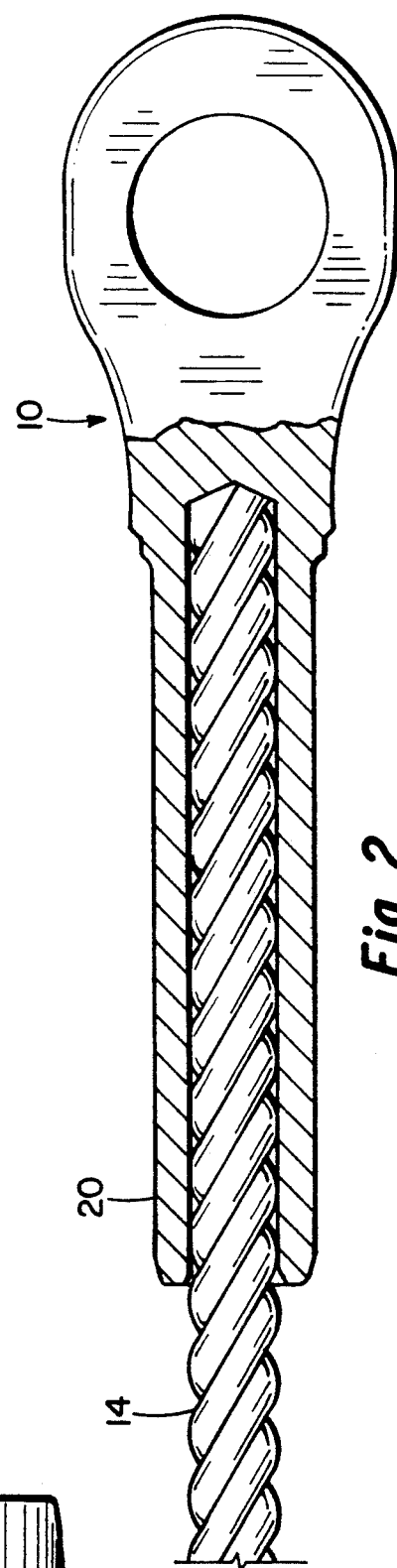
Fig. 1
Fig. 2
Fig. 3

SWAGE WITH AFTER-SWAGE DIMENSION INDICATOR

BACKGROUND OF THE INVENTION

1. Field of the Invention

This invention is directed to the broad field of terminations of wire rope. Specifically the invention is directed to swage fittings used in terminations of wire rope.

2. Description of the Related Art

In performing the attachment of a swage to a wire line or wire rope termination large capacity swaging presses are used which are rated anywhere from 200 to 3,000 ton capacities which is indicative of the amount of pressure to be applied to the swage. For a given size wire rope, the correct size fitting and the correct size and style of swaging die must be used. Typically the most important consideration in the operation of a swaging process is the overall diameter of the fitting after swaging. Heretofore the operator would refer to the after-swage dimensions found in the die chart and the product chart as a guide to verify the proper die size. In addition, the swaging dies must be checked periodically in the event of wear which will not produce the proper after-swage outer diameter.

SUMMARY OF THE INVENTION

It is an object of this invention to provide swage type fittings used for the terminations of wire line or wire rope wherein an indicator is provided as a part of the fitting in order that the operator of swaging dies will know that a proper swage has been completed.

In particular the invention is directed to a swage for attachment to a wire line that includes a cylindrical body having an interior surface of diameter sufficient to receive the given size of wire rope. The exterior surface portion of the swage is equal to a given before-swage diameter of a given length tapering at one end to a step land diameter. The step land diameter is equal to or substantially equal to the desired exterior diameter of the swage after said exterior diameter has been swaged, identified herein as the "after-swage diameter" which is an important consideration to verify a proper swaging operation.

Although this invention is generally applicable to all forms of swages it is particularly applicable to standard steel sleeve swages, steel buttons, machined steel ferrules, duplex non-tapered steel sleeves, heavy wall steel sleeves, open socket and closed socket swage fittings.

These and other objects of the invention will become readily apparent upon reference to the specification claims and drawings herein.

BRIEF DESCRIPTION OF THE DRAWINGS

FIG. 1 is a side elevational view of a closed socket type of swage fitting, partly in cross section depicting the before-swaging operation.

FIG. 2 is a partial sectional view of the closed socket of FIG. 1 in the after-swaged position.

FIG. 3 is a sectional view taken along the line 3—3 of FIG. 1.

DETAILED DESCRIPTION OF THE PREFERRED EMBODIMENT

Figure 4:
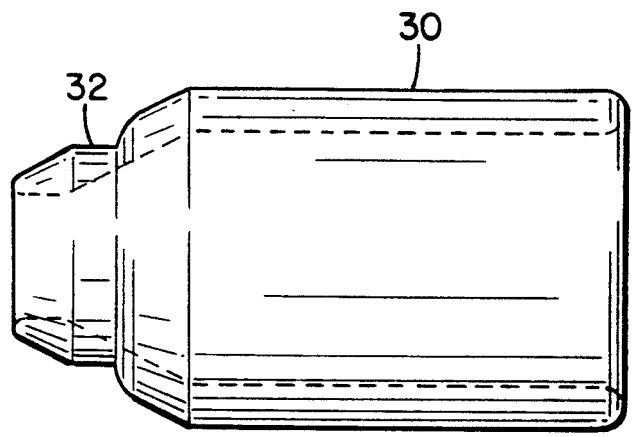
FIGS. 4, 5 and 6 represent other forms of swage sleeves incorporating the concepts of this invention.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Referring now to FIG. 1 the closed swage socket generally indicated by the numeral 10 includes an interior surface diameter 12 capable of receiving wire rope 14. The exterior swaging surface of the fitting comprises the exterior surface 16 which is equal to a before-swage diameter. The portion 16 then tapers at 18 to a step land 20. The step land diameter being an indicator of the desired after-swage diameter of the cylindrical portion 16. The after-swage diameter has been correctly accomplished as shown in FIG. 2. That is the length of the swage is now equal to the original step land diameter 20 which identifies that the correct amount of swaging force has been applied to the swage for the accomplishment of proper connection termination of the wire line 14.

Figure 5:
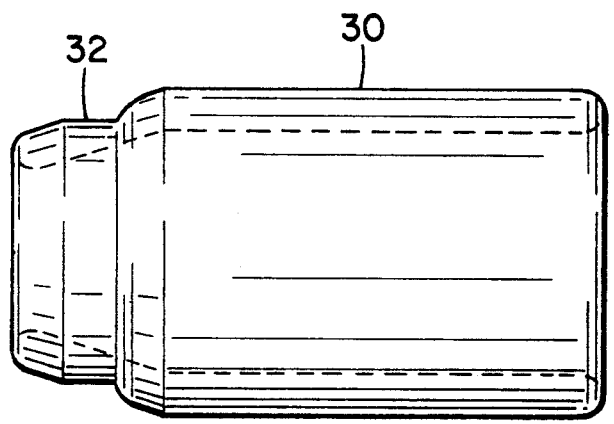
Figure 6:
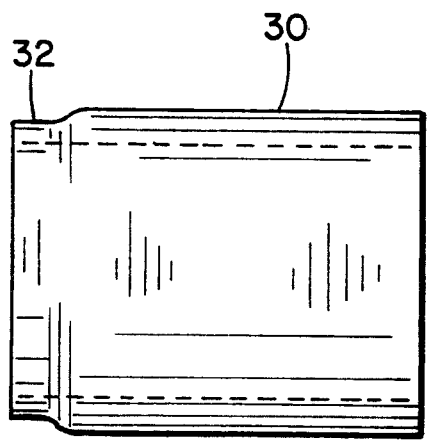

The swaging sleeves in FIGS. 4-6 include respectively the before-swage diameter 30 and a step land 32 of diameter equal to the desired after-swage diameter.

In some instances the actual after-swage diameter on the swage product is slightly larger than the specified after-swage diameter. Apparently, in some instances the swaging press operation will cause a reduction of the actual after-swage diameter.

Although the invention has been described relative to the after-swage diameter step land being a diameter, it is within the scope of this invention to include a step land which is a portion of a circular diameter or a flat portion equal to the after-swage diameter.

Also it is within the realm of the invention to place the step land at other places on the swage as well as the end as shown.

What is claimed is:

1. A steel swage for attachment to a wire rope, comprising: a cylindrical body having an interior surface to receive said wire rope and an exterior swaging surface having a diameter terminating at one end with a circular step land, a diametric dimension across said step land being less than the diameter of said exterior swaging surface yet equal to a desired visible exterior diameter after said exterior swaging surface diameter has been properly swaged.

2. The swage of claim 1 being a closed swage socket.

3. A steel swage for attachment to a wire rope, comprising: a cylindrical body having an interior surface to receive said wire rope and an exterior swaging surface having a diameter tapering at one end to a step land, a dimension of said step land being less than the diameter of said exterior swaging surface yet equal to a desired visible exterior diameter after said exterior swaging surface diameter has been properly swaged.

4. The swage of claims 1, 2 or 3 being an open swage socket.

5. The swage of claims 1, 2 or 3 being a heavy wall sleeve.

6. The swage of claims 1, 2 or 3 being a duplex steel sleeve.

7. A steel swage for attachment to a wire rope, comprising: a cylindrical body having an interior surface to receive said wire rope and an exterior swaging surface having a diameter, a step land in said exterior swaging surface, said step land of a dimension less than the diameter of said exterior swaging surface yet equal to a desired visible exterior diameter after said exterior swaging surface diameter has been properly swaged.

* * * * *